(No Model.)

I. H. REINER.
WHEEL FOR VEHICLES.

No. 354,584. Patented Dec. 21, 1886.

Attest
E. M. Breckinseed
J. L. Maguire

Inventor
Isaiah H. Reiner
By his atty

UNITED STATES PATENT OFFICE.

ISAIAH H. REINER, OF LINE LEXINGTON, PENNSYLVANIA.

WHEEL FOR VEHICLES.

SPECIFICATION forming part of Letters Patent No. 354,584, dated December 21, 1886.

Application filed February 18, 1886. Serial No. 192,388. (No model.)

*To all whom it may concern:*

Be it known that I, ISAIAH H. REINER, of Line Lexington, county of Montgomery, State of Pennsylvania, have invented an Improvement in Wheels for Vehicles, of which the following is a specification.

My invention has reference to wheels especially adapted to agricultural purposes; and it consists in certain improvements fully set forth in the following specification, and shown in the accompanying drawings, which form part thereof.

The object of my invention is to form a wheel entirely of metal, in which the tire shall be of T-shaped iron, the rib being on the inner face, and in which the spokes are removable, when desired.

Figure 1:
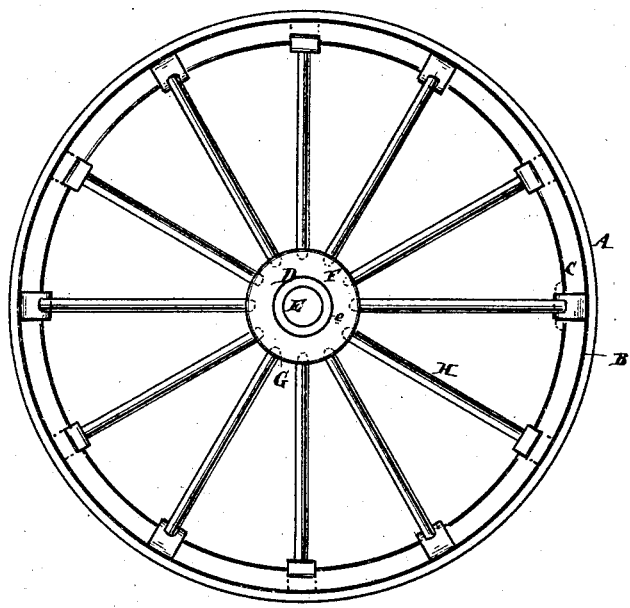
Figure 2:
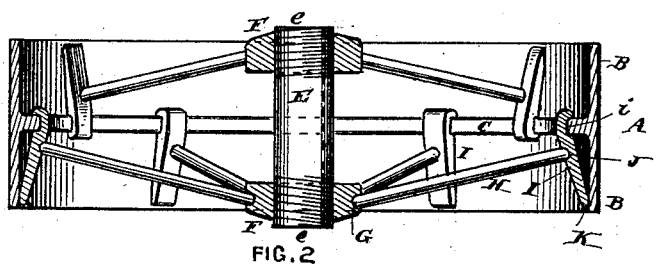

In the drawings, Figure 1 is a side elevation of a wheel embodying my improvements, and Fig. 2 is a cross-section of same on line $x\ x$.

A is the tire of the wheel, and is made of T-iron, in which B B are the main flanges, and form the face of the wheel, and C is the inner or strengthening rib.

E is the bearing of the hub D of the wheel, and is formed like a tube, and has its ends screw-threaded with right and left hand threads, as at $e$. Screwed onto these ends of the tube E are the hub-flanges F, which are provided with depressions G in their peripheries.

H are the spokes, made of iron rods or tubing, and at their inner ends rest in the said depressions G on the hub-flanges, and at their outer ends are received in depressions J on the shoes I, which are supported at $i$ upon the rib C of the tire and at the points K upon the outer edges of the flanges B thereof. These pieces or shoes I and spokes are staggered, one half being in connection with the hub-flange F upon one side of the axle-bearing and the other half with the other flange. The hub is made of sufficient length that the thrust of the spokes H shall be toward the center of the tire, and by the construction shown a very thin flange, B, might be used, as it would be supported at its outer end by the shoes I.

In putting this wheel together the flanges F of the hub are attached to the tubular portion E, and after the parts are all properly adjusted the said tubular part E is revolved, causing the flanges F to approach each other and drawing the inner ends of the spokes attached to each flange toward each other, and thereby causing their outer ends to press with great force upon the shoes I. If desired, the rib C may be provided with projections, as indicated in dotted lines, Fig. 1, between which the said shoes I are held.

I do not limit myself to the exact shape of the shoes, as they may be modified to suit tires of different widths, and, if desired, may fit snugly to the same.

Having now described my invention, what I claim as new, and desire to secure by Letters Patent, is—

1. In a wheel for vehicles, the combination of the hub with the T-shaped tire, the spokes, and the shoes to receive the outer ends of said spokes, the said shoes resting upon the inner rib and the outer flange of the tire, substantially as and for the purpose specified.

2. The combination of the tire with oblique spokes, a hub consisting of the tubular bearing E, having right and left hand threads on its respective ends, and flanges adapted to support the spokes and screw upon said ends when said tubular part is turned or rotated, whereby the spokes may be made to press outward against the tire, loose shoes supporting the tires and receiving the ends of the spokes, whereby the wide flange of the wheel is strengthened, and when the wheel is tightened the bearing between the spokes, hubs, or flanges will be the greatest, substantially as and for the purpose specified.

3. The combination of the tire made T-shaped with oblique spokes, a hub consisting of the tubular bearing E, having right and left hand threads on its respective ends, and flanges adapted to support the spokes and screw upon said ends when said tubular part is turned or rotated, whereby the spokes may be made to press outward against the tire, and shoes interposed between the spokes and tire, and having notches on one end to fit upon the inner rib of the tire, to prevent lateral displacement, substantially as and for the purpose specified.

4. The combination of tubular bearing part

E, having right and left hand screw-threads $e$ on its respective ends, flanges G, to screw on the ends of said part E, and adapted to receive the spokes, spokes H, the T-shaped tire A, having rib C, flanges B, and shoes I, supported on said tire at its rib C and outer edges of the flanges B, substantially as and for the purpose specified.

5. The T-shaped tire A, shoes I, resting thereon, spokes H, one end thereof pressing upon said shoes, hub-flanges F, supporting the other ends of said spokes, and means to draw said flanges together to cause the spokes to press outward toward the tire, substantially as and for the purpose specified.

In testimony of which invention I hereunto set my hand.

ISAIAH H. REINER.

Witnesses:
SAMUEL REINER,
WILLIAM H. PRICE.